United States Patent
Otawa et al.

(10) Patent No.: US 7,029,783 B1
(45) Date of Patent: Apr. 18, 2006

(54) FUEL CELL SEPARATOR AND PRODUCTION METHOD THEREFOR

(75) Inventors: Kazuhiko Otawa, Osaka (JP); Tsunemori Yoshida, Sanda (JP); Katsunori Sugita, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 539 days.

(21) Appl. No.: 10/168,765

(22) PCT Filed: Oct. 23, 2000

(86) PCT No.: PCT/JP00/07361

§ 371 (c)(1), (2), (4) Date: Jun. 19, 2002

(87) PCT Pub. No.: WO02/35629

PCT Pub. Date: May 2, 2002

(51) Int. Cl.
*H01M 8/02* (2006.01)
(52) U.S. Cl. .............................. 429/34; 429/35; 429/36
(58) Field of Classification Search .................. 429/34, 429/35, 36, 37, 38, 39
See application file for complete search history.

(56) References Cited

U.S. PATENT DOCUMENTS

2002/0004156 A1 * 1/2002 Mizuno ........................ 429/34

FOREIGN PATENT DOCUMENTS

| JP | H4-305083 | 10/1992 |
| JP | H8-180892 | 7/1996 |
| JP | H11-204120 | 7/1999 |
| JP | H11-297338 | 10/1999 |
| JP | 2000-285931 | 10/2000 |

* cited by examiner

*Primary Examiner*—Michael Barr
*Assistant Examiner*—Monique Wills
(74) *Attorney, Agent, or Firm*—Koda & Androlia

(57) ABSTRACT

According to the invention, in a separator (4) for a fuel cell which is produced by: loading a complex compound that is configured by bonding graphite powder by means of a thermosetting resin, into a mold (14); and forming ribs (11) for forming gas passages by the resin molding process, the surfaces of the ribs (11) are etched by an alkaline solution or alkali-treated, a surface resin layer which is formed on the surface of the separator (4) is removed away, and graphite particles showing a plate-like form are exposed from the surfaces of the ribs (11) which function as a contact surface with an electrode, whereby the contact resistance with an electrode is remarkably lowered, so that the performance and efficiency of the fuel cell can be improved.

4 Claims, 12 Drawing Sheets

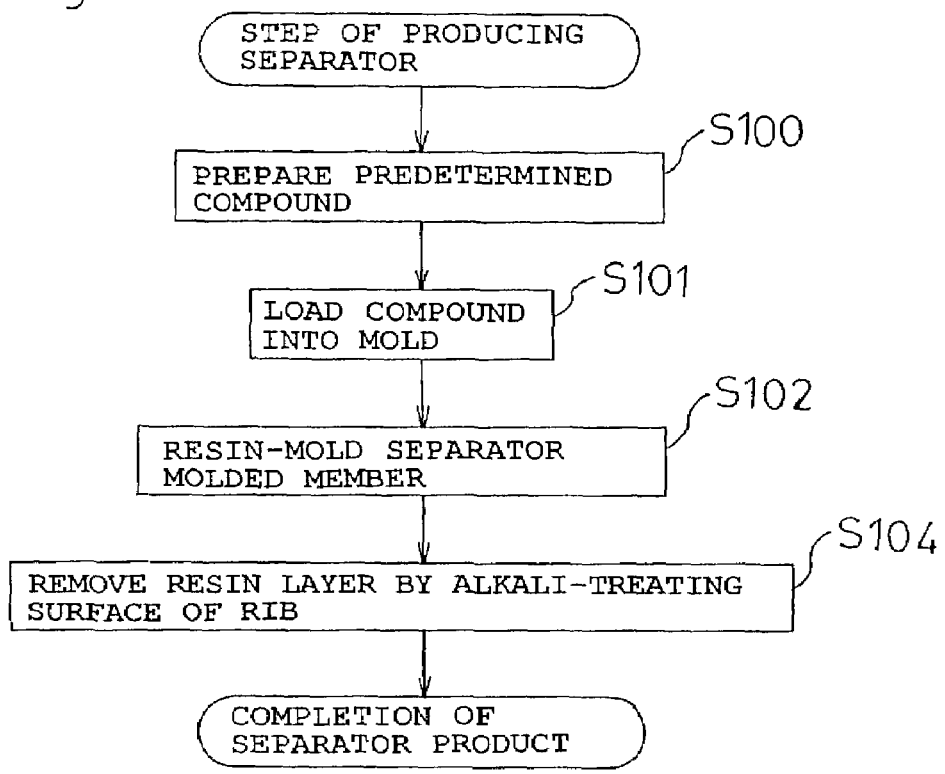
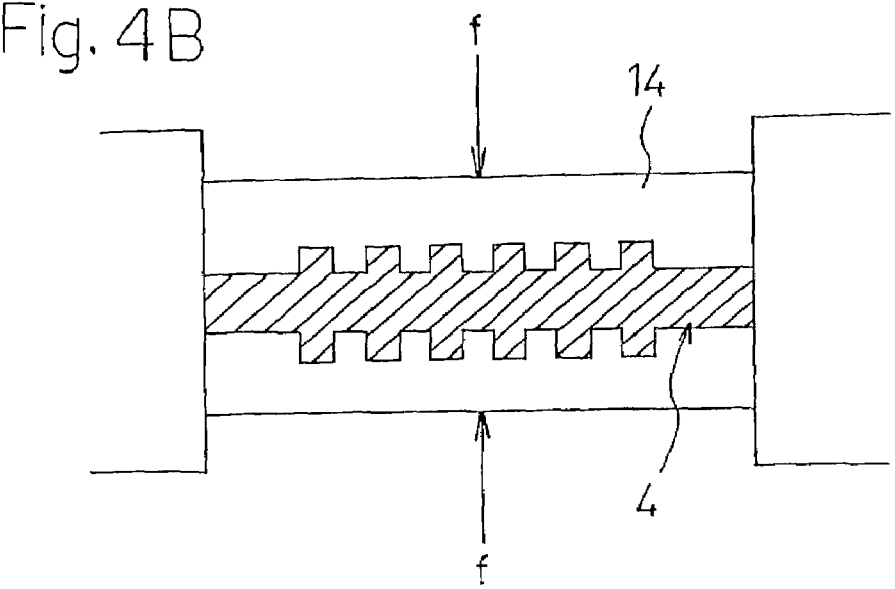

Fig. 5
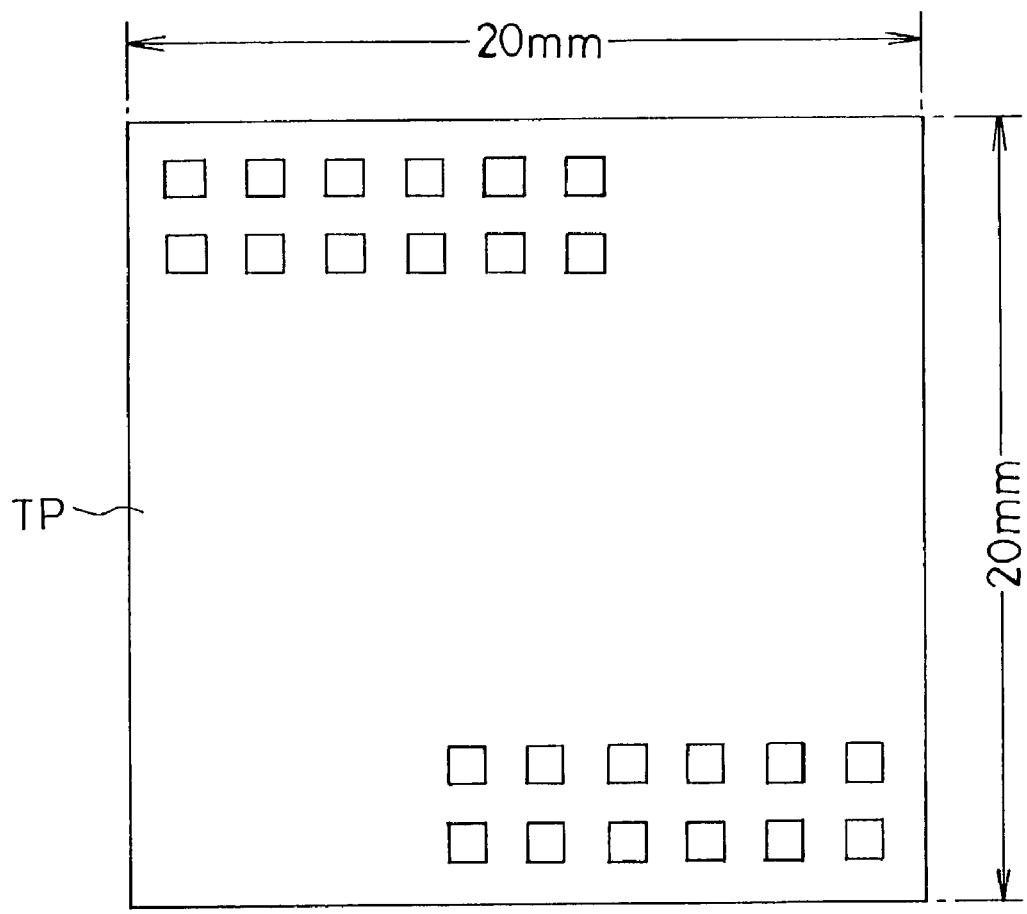
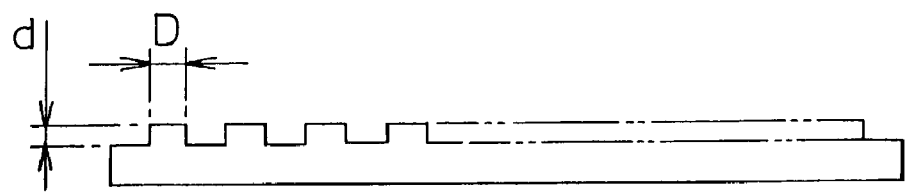

×100

×500

×100

×500

×100

×500

×100

×500

×100

×500

×100

×500

×100

×500

FUEL CELL SEPARATOR AND PRODUCTION METHOD THEREFOR

TECHNICAL FIELD

The present invention relates to a fuel cell separator which is mainly used as a cell for an electric vehicle, and also to a method of producing the separator, and more particularly to a fuel cell separator of the solid polymer electrolyte type or the phosphoric acid type which is used for: sandwiching a gas diffusion electrode having a sandwich structure wherein an electrolyte membrane configured by an ion exchange membrane is interposed between an anode and a cathode from both the outer sides; and forming fuel gas passages, oxidant gas passages, and coolant water passages between the anode and the cathode, thereby constituting a unit cell that is a unit of the fuel cell, and also to a method of producing the separator.

BACKGROUND ART

In a fuel cell, a fuel gas containing hydrogen is supplied to an anode, and an oxidant gas containing oxygen is supplied to a cathode, so that, in the anode and the cathode, electrochemical reactions indicated by the formulae:

$$H_2 \rightarrow 2H^+ + 2e^- \quad (1)$$

$$(\tfrac{1}{2})O_2 + 2H^+ + 2e^- \rightarrow H_2O \quad (2)$$

occur, and, in the whole of the cell, an electrochemical reaction indicated by the formula:

$$H_2 + (\tfrac{1}{2})O_2 \rightarrow H_2O \quad (3)$$

proceeds. The chemical energy of the fuel is directly converted into an electrical energy, with the result that the cell can exert predetermined cell performance.

A fuel cell separator of the solid polymer electrolyte type or the phosphoric acid type in which such energy conversion is conducted is requested to be gas-impermeable, and also to be made of a material of high electrical conductivity in order to improve the energy conversion efficiency. Conventionally, it is known that, as a material meeting the requirements, an electrically conductive resin is used. An electrically conductive resin is a complex which is configured by bonding graphite (carbon) powder by means of a thermosetting resin such as phenol resin, or a so-called bondcarbon (resin-bonded carbon) compound. A technique is conventionally employed in which a fuel cell separator is produced by loading the bondcarbon compound into a mold, and resin-molding into a predetermined shape in which ribs for forming fuel gas passages, oxidant gas passages, or coolant water passages are formed integrally on at least one face of a separator molded member.

In such a fuel cell separator which is resin-molded into the predetermined shape by using a bondcarbon compound, when the thermosetting resin is softened by heating during the resin molding process, part of the thermosetting resin oozes to the surface layer to form a thin resin layer on the surface of the separator molded member. The thin resin layer is naturally formed also on the surfaces of the ribs for forming passages and functioning as a contact surface with an electrode in a product (separator).

The thin resin layer which is formed on the surface of the separator molded member in this way is an electrical insulating layer, and does not exhibit conductivity. As a whole of the separator, therefore, the conductivity is lowered, and the specific resistance is increased. Moreover, also the contact resistance with an electrode is increased by the presence of the thin resin layer which is formed on the surfaces of the ribs. The contact resistance with an electrode on the surface of each rib which is increased by the formation of the thin resin layer is larger by one digit than the specific resistance of the whole separator which is similarly increased by the formation of the thin resin layer. The increase of the contact resistance more strongly affects the internal resistance of the fuel cell which is the sum of the specific resistance and the contact resistance. In order to improve the performance and efficiency of the fuel cell, therefore, it is requested to reduce the contact resistance of the surfaces of the ribs with an electrode, as much as possible.

As means for satisfying such a request, conventionally, the following means have been proposed. For example, Japanese Patent Application Laying-Open No. 11-204120 discloses means for polishing away the surfaces of ribs to physically remove a thin resin layer, and Japanese Patent Application Laying-Open No. 11-297338 discloses means for immersing a separator in, for example, a strongly acidic solution into which one or two or more of hydrochloric acid, sulfuric acid, nitric acid, hydrofluoric acid, and the like are mixed, to acid-treat the surface, whereby the surface roughness of the surfaces of the ribs is adjusted to Ra=0.1 μm to 10 μm so as to reduce the contact resistance.

In the case of the former one of the means which have been conventionally proposed, i.e., the resin layer physically removing means based on polish removal of the surfaces of the ribs, it is technically very difficult to remove only the thin resin layer, and hence also graphite particles which contribute to the conductivity are easily removed away together to reduce the amount of graphite particles in the surfaces of the ribs. As a result, the graphite density of the contact surface with an electrode is reduced, so that the contact resistance cannot be sufficiently lowered.

In the case of the latter means, i.e., the means for immersing a separator in an acidic solution to acid-treat the surface, if the surface roughness is not adjusted to the above-mentioned specific range, the contact resistance tends to be increased on the contrary. Therefore, the treatment itself requires a very sophisticated technique and much labor, and hence the means is not preferable from the viewpoints of the production efficiency of a separator, and the production cost. Furthermore, the means has problems in that, during the acid treatment, the acidic solution reacts with graphite particles to form graphite oxide and reduce free electrons, and, because of this and the like, the conductivity inherent in graphite particles is easily impaired, and that phenol resin itself is acid resistant and is not efficiently eroded, and hence the specific resistance of the whole separator is increased and the contact resistance with an electrode cannot be sufficiently lowered.

DISCLOSURE OF INVENTION

The present invention has been conducted in view of the above-mentioned circumstances. It is an object of the invention to provide a fuel cell separator in which only a resin layer on the surface can be efficiently removed and adaptability with an electrode can be improved to remarkably lower the contact resistance, without removing graphite particles contributing to the conductivity and impairing the conductivity inherent in graphite particles, and also a method of producing the separator.

The fuel cell separator according to the first invention is a fuel cell separator which consists of a complex that is configured by bonding graphite powder by means of a thermosetting resin, and in which ribs for forming fuel gas passages, oxidant gas passages, or coolant water passages are formed on at least one face by a resin molding method, and characterized in that surfaces of the ribs for forming passages and functioning as a contact surface with an electrode are etched by an alkaline solution or alkali-treated to remove a surface resin layer, thereby exposing graphite particles from the surfaces of the ribs. The method of producing a fuel cell separator according to the second invention is a method of producing a fuel cell separator in which a complex that is configured by bonding graphite powder by means of a thermosetting resin is shaped and ribs for forming fuel gas passages, oxidant gas passages, or coolant water passages are formed on at least one face, and characterized in that the method comprises the steps of: loading a complex compound into a mold to resin-mold a fuel cell separator of a predetermined shape including the ribs; and removing a surface resin layer of the ribs for forming passages of the resin-molded separator by etching using an alkaline solution or an immersion treatment in an alkaline solution, the ribs functioning as a contact surface with an electrode, thereby exposing graphite particles from the surfaces of the ribs.

According to the first and second inventions having these constituent components, the thin resin layer which is formed on the surfaces of the ribs by oozing of part of the thermosetting resin during the resin molding process is selectively removed away by an alkali treatment such as etching using an alkaline solution or an immersion treatment in an alkaline solution. As compared with the polish removing means which has been conventionally proposed, therefore, only the resin layer can be removed away efficiently and surely without reducing the amount of graphite particles contributing to the conductivity, and while maintaining the density of graphite particles in the surfaces of the ribs to a high level. As compared with the acid-treating means which has been conventionally proposed, the surface resin layer can be removed away to expose graphite particles from the surfaces of the ribs without producing impairment of the conductivity inherent in graphite particles which is caused by reaction of a treatment solution with graphite particles to form graphite oxide, and participation of free electrons of graphite in the reaction, and while maintaining the conductivity inherent in graphite particles to a satisfactory level. Therefore, not only the specific resistance of the whole separator, but also the contact resistance with an electrode which very strongly affects the internal resistance of the fuel cell can be remarkably lowered.

Since soft graphite particles are exposed from the surfaces of the ribs by the removal of the thin resin layer, moreover, the adaptability with an electrode can be improved. As a result of the improvement of the adaptability, graphite particles are easily deformed by contact with an electrode to fill resin defective portions between graphite particles, so that also the contact area with an electrode can be enlarged. The improved adaptability with an electrode and the enlarged contact area can further lower the contact resistance.

Furthermore, the improved adaptability with an electrode attains an effect that also the gas impermeability (sealing property) between the electrode surface and the contact surface can be improved.

In the fuel cell separator according to the first invention and the method of producing a fuel cell separator according to the second invention, the composition ratio of the thermosetting resin which is one of the compositions of the complex, and which largely affects the fluidity, the moldability, and the strength may be set to a range of 10 to 40 wt. %, preferably, 13 to 30 wt. %, and the average particle diameter of the graphite powder which is the other composition of the complex, and which largely affects the contact resistance may be set to a range of 15 to 125 µm, preferably, 40 to 100 µm, whereby the elongation and fluidity of the complex serving as a molding material can be enhanced to improve the moldability. Furthermore, the contact resistance with an electrode can be lowered to improve the performance and efficiency of the fuel cell, while ensuring strength sufficient for preventing the separator from suffering a damage such as a breakage due to vibrations or the like.

In the fuel cell separator according to the first invention and the method of producing a fuel cell separator according to the second invention, graphite particles may be exposed from the surfaces of the ribs by the alkali treatment so as to show a plate-like form, whereby the contact area between the surfaces of the ribs and an electrode can be enlarged, so that the contact resistance can be further lowered.

As the thermosetting resin which is useful in the first and second inventions, phenol resin which is excellent in wettability with respect to graphite powder may be most preferably used. Alternatively, any other resin such as polycarbodiimide resin, epoxy resin, furfuryl alcohol resin, urea resin, melamine resin, unsaturated polyester resin, or alkyd resin may be used as far as the resin causes a thermosetting reaction when the resin is heated, and is stable against the operating temperature of the fuel cell and components of the supplied gasses.

As the graphite powder which is useful in the first and second inventions, powder of graphite of any kind, including natural graphite, artificial graphite, carbon black, kish graphite, and expanded graphite may be used. In consideration of conditions such as the cost, the kind can be arbitrarily selected. In the case where expanded graphite is used, particularly, a layer structure is formed by expanding the volume of the graphite as a result of heating. When the molding pressure is applied, layers can twine together to be firmly bonded to one another. Therefore, expanded graphite is effective in a complex in which the ratio of a thermosetting resin is to be reduced.

As the alkaline solution which is useful in the first and second inventions, for example, an aqueous solution of a hydroxide such as potassium hydroxide or sodium hydroxide, or a solution in which an additive such as potassium ferricyanide is added to such a solution may be used. Graphite particles are exposed from the surfaces of the ribs by etching the surfaces of the ribs for forming passages and functioning as a contact surface with an electrode, or performing an immersion treatment by using the alkaline solution.

BRIEF DESCRIPTION OF DRAWINGS

FIG. 4A is a chart illustrating steps of producing the separator of the invention;

FIG. 4B is a view illustrating the manner of the production;

FIG. 5 is a view illustrating a test piece which is used in test examples of the invention;

BEST MODE FOR CARRYING OUT THE INVENTION

Figure 1:
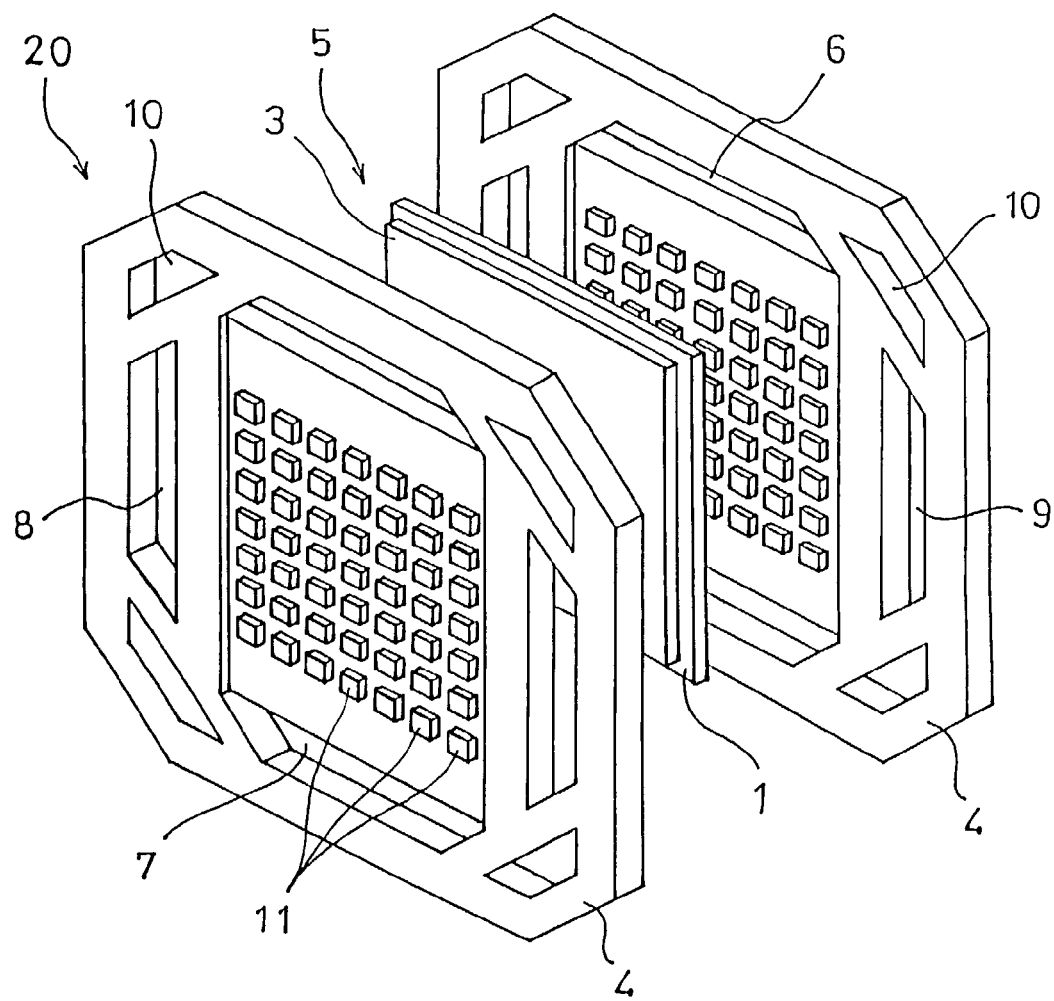
FIG. 1 is an exploded perspective view showing the configuration of a stack structure constituting a solid polymer electrolyte type fuel cell which has the separator of the invention.

Hereinafter, an embodiment will be described. FIG. 1 shows the configuration of a stack structure constituting a solid polymer electrolyte type fuel cell which has the separator of the invention.

The solid polymer electrolyte type fuel cell 20 has a stack structure wherein plural unit cells 5 each of which is configured by: an electrolyte membrane 1 that is an ion exchange membrane made of, for example, a fluororesin; an anode 2 and a cathode 3 that are formed by carbon cloth woven of carbon filaments, carbon paper, or carbon felt, and that sandwich the electrolyte membrane 1 from both the sides to constitute a gas diffusion electrode having a sandwich structure; and separators 4, 4 that sandwich the sandwich structure from both the sides are stacked, and collector plates that are not shown are respectively placed on both the ends.

Figure 2:
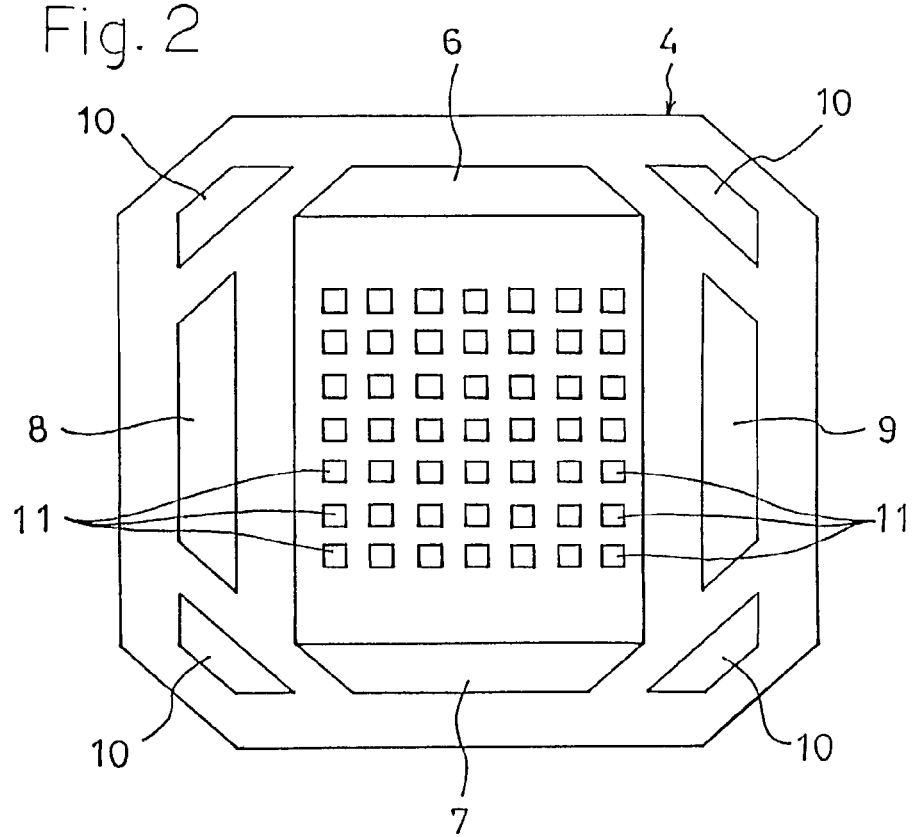
FIG. 2 is an external front view of the separator in the solid polymer electrolyte type fuel cell.

In each of the separators 4, as clearly shown in FIG. 2, fuel gas holes 6 and 7 containing hydrogen, oxidant gas holes 8 and 9 containing oxygen, and a coolant water hole 10 are formed in the peripheral area. When plural unit cells 5 are stacked, the holes 6, 7, 8, 9, and 10 of each separator 4 pass through the interior of the fuel cell 20 in the longitudinal direction to form a fuel gas supply manifold, a fuel gas discharge manifold, an oxidant gas supply manifold, an oxidant gas discharge manifold, and a coolant water passage, respectively.

Figure 3:
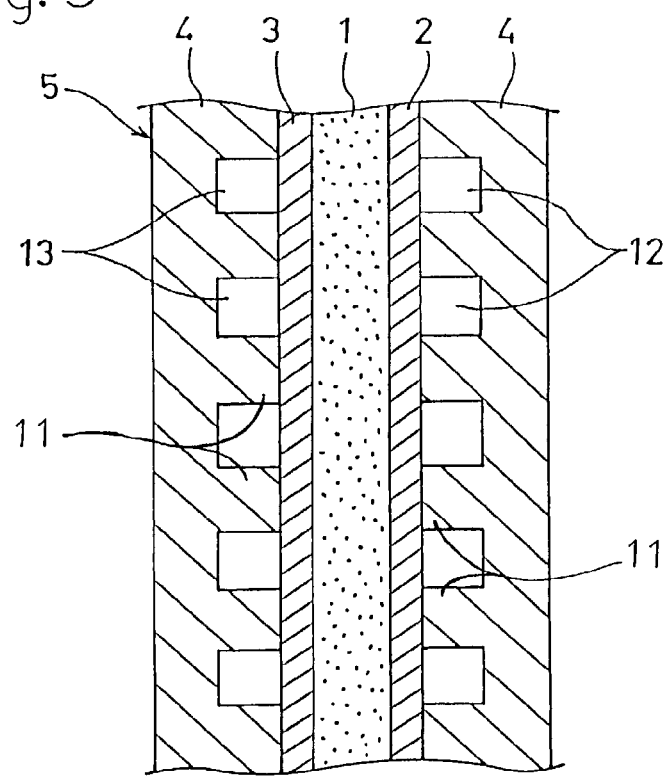
FIG. 3 is an enlarged section view of main portions and showing the configuration of a unit cell which is a unit constituting the solid polymer electrolyte type fuel cell.

Ribs 11 having a predetermined shape are integrally formed on the surfaces of the separators 4. As shown in FIG. 3, fuel gas passages 12 are formed between the ribs 11 and the surface of the anode 2, and oxidant gas passages 13 are formed between the ribs 11 and the surface of the cathode 3.

In the solid polymer electrolyte type fuel cell 20 configured as described above, the fuel gas which is supplied from an externally disposed fuel gas supplying device to the fuel cell 20, and which contains hydrogen is then supplied into the fuel gas passages 12 of each unit cell 5 via the fuel gas supply manifold to cause the electrochemical reaction indicated by formula (1) above, on the side of the anode 2 of the unit cell 5. After the reaction, the fuel gas is discharged to the outside from the fuel gas passages 12 of the unit cell 5 via the fuel gas discharge manifold. At the same time, the oxidant gas (air) which is supplied from an externally disposed oxidant gas supplying device to the fuel cell 20, and which contains oxygen is supplied into the oxidant gas passages 13 of each unit cell 5 via the oxidant gas supply manifold to cause the electrochemical reaction indicated by formula (2) above, on the side of the cathode 3 of the unit cell 5. After the reaction, the oxidant gas is discharged to the outside from the oxidant gas passages 13 of the unit cell 5 via the oxidant gas discharge manifold.

In accordance with the electrochemical reactions of formulae (1) and (2) above, in the whole of the fuel cell 20, the electrochemical reaction indicated by the formula (3) above proceeds, so that the chemical energy of the fuel is directly converted into an electrical energy, with the result that the cell can exert predetermined performance. Because of the characteristics of the electrolyte membrane 1, the fuel cell 20 is operated in a temperature range of about 80 to 100° C., and hence involves heat generation. During operation of the fuel cell 20, therefore, coolant water is supplied from an externally disposed coolant water supplying device to the fuel cell 20, and the coolant water is circulated through the coolant water passage, thereby preventing the temperature of the interior of the fuel cell 20 from being raised.

A method of producing the separator 4 in the solid polymer electrolyte type fuel cell 20 which is configured and operates as described above will be described with reference to FIGS. 4A and 4B. The separator 4 is molded by using a complex (bondcarbon) in which the composition ratios are set to 60 to 90 wt. %, preferably, 70 to 87 wt. % of graphite powder, and 10 to 40 wt. %, preferably, 13 to 30 wt. % of a thermosetting resin. The graphite powder and the thermosetting resin are uniformly mixed with each other and adjusted to produce a predetermined compound (step S100). The compound is loaded into a mold 14 having a predetermined molding shape including recesses for forming the ribs 11 (step S101). Under this state, the mold 14 is heated to 150 to 200° C. to elevate the temperature, and a pressing machine which is not shown is operated to apply a pressure in a range of 10 to 100 MPa, preferably, 20 to 50 MPa in the directions of the arrows f in FIG. 4B, whereby a separator molded member 4A of a predetermined shape having the ribs 11 is resin-molded in accordance with the shape of the mold 14 (step S102).

Next, in the separator molded member 4A which has been resin-molded as described above, the surfaces of the ribs 11 which form the gas passages 12 and 13 when the separators are incorporated into a fuel cell are etched by an alkaline solution or alkali-treated to remove the surface resin layer (step S103), whereby graphite particles are exposed from the surfaces of the ribs 11 which function as a contact surface with an electrode, to complete the production of the separator 4 which is a final product.

In the thus produced separator 4, only the thin resin layer formed on the surfaces of the ribs 11 can be efficiently removed away, and graphite particles can be exposed at a high density from the surfaces of the ribs 11 which function as a contact surface with an electrode, without reducing the amount of graphite particles contributing to the conductivity, and without allowing the treatment solution to erode the inside of graphite particles to impair the conductivity inherent in graphite particles, or while maintaining the conductivity inherent in graphite particles to a satisfactory level. Since graphite particles exposed from the surfaces of the ribs 11 show a plate-like form and are soft, the contact area with an electrode is enlarged, and the adaptability with an electrode is excellent. The improvement of the adaptability in such a large contact area allows graphite particles in the surfaces of the ribs 11 which will contact with an electrode, to be easily deformed, and resin defective portions between graphite particles are filled as a result of the deformation. Therefore, the contact area with an electrode can be further enlarged.

By the synergistic action of the above, the specific resistance of the whole separator 4 can be lowered while ensuring the excellent conductivity due to graphite particles, and the contact resistance with an electrode which very strongly affects the internal resistance of the fuel cell can be remarkably lowered. Furthermore, because of the improvement of the adaptability with an electrode, the gas impermeability (sealing property) between the electrode surface and the contact surface can be improved.

When the composition ratio of the thermosetting resin which largely affects the fluidity, the moldability, and the strength is set to a range of 10 to 40 wt. %, preferably, 13 to 30 wt. %, and the average particle diameter of the graphite powder which largely affects the contact resistance is set to a range of 15 to 125 μm, preferably, 40 to 100 μm, the elongation and fluidity of the complex serving as a molding material can be enhanced to improve the moldability, and the contact resistance with an electrode can be lowered to improve the performance and efficiency of the fuel cell, while ensuring strength sufficient for preventing the separator from suffering a damage such as a breakage due to vibrations or the like.

Hereinafter, the invention will be described in more detail by way of test examples which were conducted by the inventor.

Test Pieces;

Test pieces TP are used that were shaped into 20 mm square so as to have 100 ribs in which depth (d)×diameter (D) is 0.5×1.00 (mm) as show in FIG. 5, by: loading a bondcarbon compound which was prepared at the composition ratios of 85 wt. % of natural graphite powder having an average particle diameter of 100 μm, and 15 wt. % of phenol resin, into a mold; and conducting a heat treatment for 2 minutes while applying a molding pressure of 15 MPa at a molding temperature of 165° C.

Contents of Treatment on the Surfaces of the Ribs (Contact Surface with an Electrode);

EXAMPLE 1

Etching by Alkaline Solution

A test piece was immersed for 20 seconds in an alkaline aqueous solution which was prepared by dissolving 20 g of potassium hydroxide (KOH) and 20 g of potassium ferricyanide $\{K_3Fe(CN)_6\}$ in 80 ml of water, and then boiling the solution. The test piece was then rinsed under running water, and dried.

COMPARATIVE EXAMPLE 1

Grinding

Surface portions of the ribs were removed away by a thickness of 0.1 mm by a grinder.

COMPARATIVE EXAMPLE 2

Grinding

Surface portions of the ribs were removed away by a thickness of 0.3 mm by a grinder.

COMPARATIVE EXAMPLE 3

Lapping

The surfaces of the ribs were buffed with attaching a polishing member of 5 μm to a lapping machine.

COMPARATIVE EXAMPLE 4

Hand-Lapping

Surface portions of the ribs were removed away by a thickness of 0.01 mm by hand-lapping using sand paper of #2000.

COMPARATIVE EXAMPLE 5

Hand-Lapping

Surface portions of the ribs were removed away by a thickness of 0.05 mm by hand-lapping using sand paper of #2000.

Figure 6A:
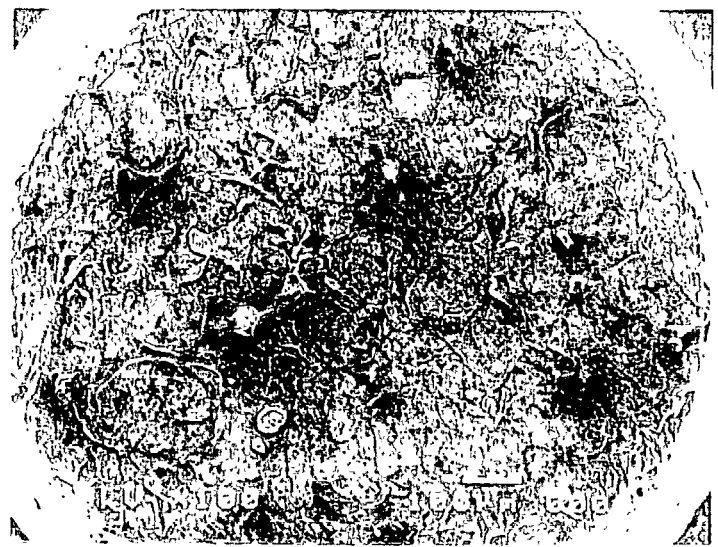
FIGS. 6A and 6B are photographs substituted for drawings showing the surface condition of ribs of a resin-molded test piece before treatment, by using an electron microscope at magnifications of 100 times and 500 times.
Figure 6B:
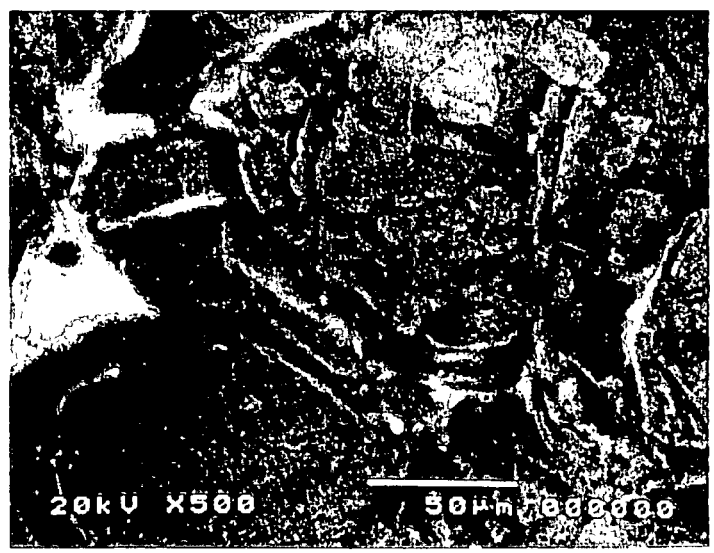
Figure 7A:
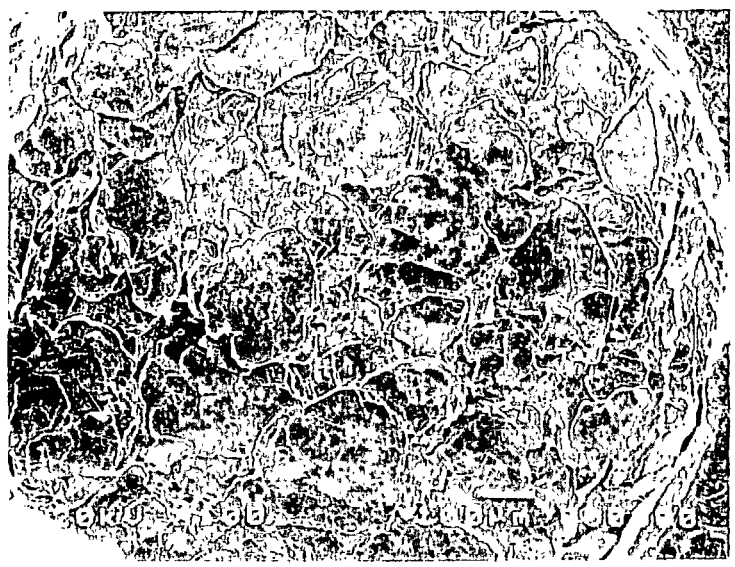
FIGS. 7A and 7B are photographs substituted for drawings showing the surface condition of ribs in Example 1 after treatment, by using an electron microscope at magnifications of 100 times and 500 times.
Figure 7B:
Figure 8A:
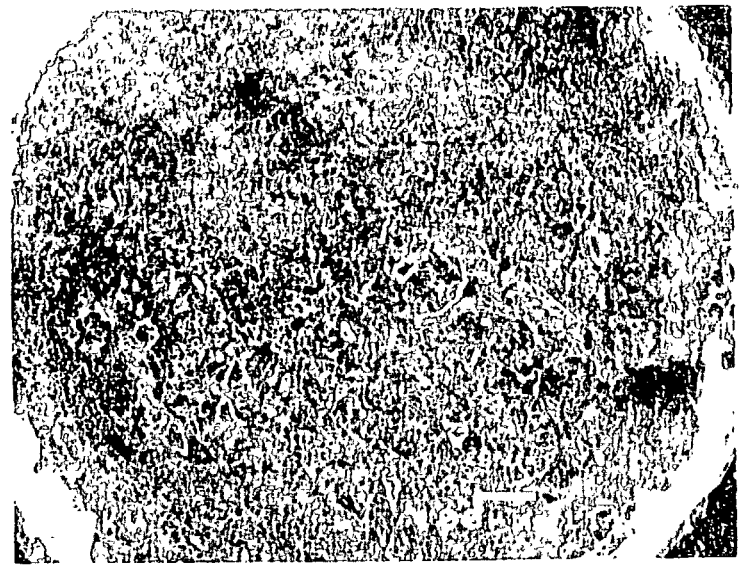
FIGS. 8A and 8B are photographs substituted for drawings showing the surface condition of ribs in Comparative Example 1 after treatment, by using an electron microscope at magnifications of 100 times and 500 times.
Figure 8B:
Figure 9A:
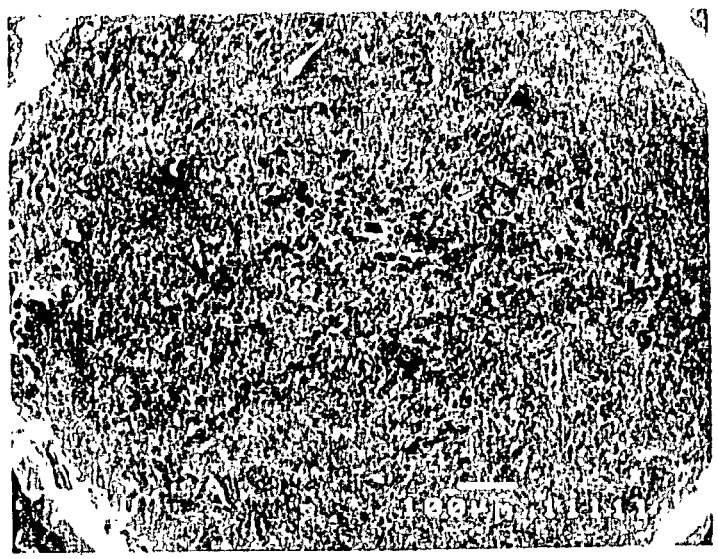
FIGS. 9A and 9B are photographs substituted for drawings showing the surface condition of ribs in Comparative Example 2 after treatment, by using an electron microscope at magnifications of 100 times and 500 times.
Figure 9B:
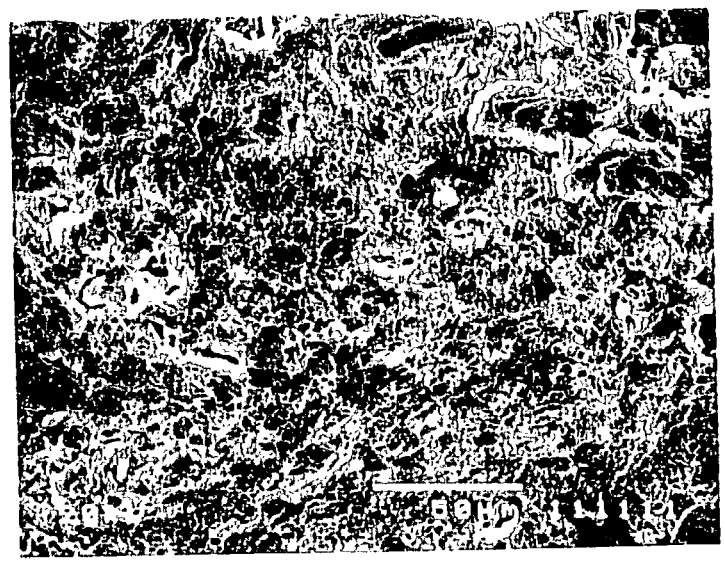
Figure 10A:
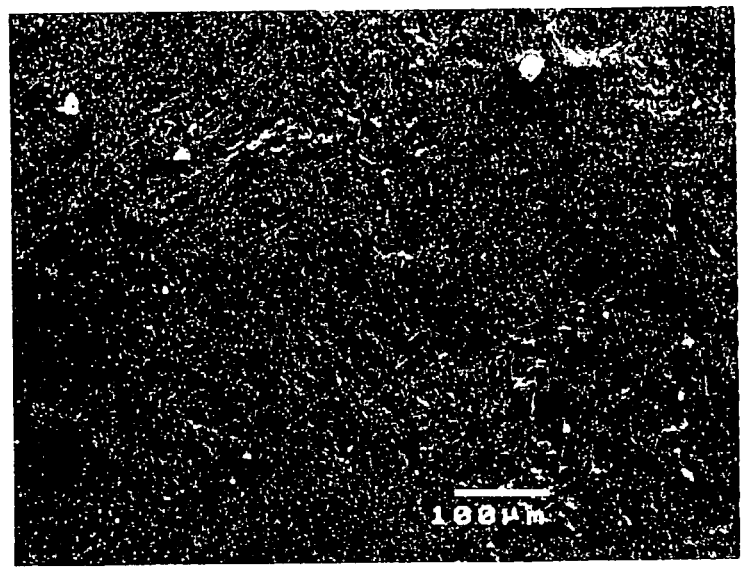
FIGS. 10A and 10B are photographs substituted for drawings showing the surface condition of ribs in Comparative Example 3 after treatment, by using an electron microscope at magnifications of 100 times and 500 times.
Figure 10B:
Figure 11A:
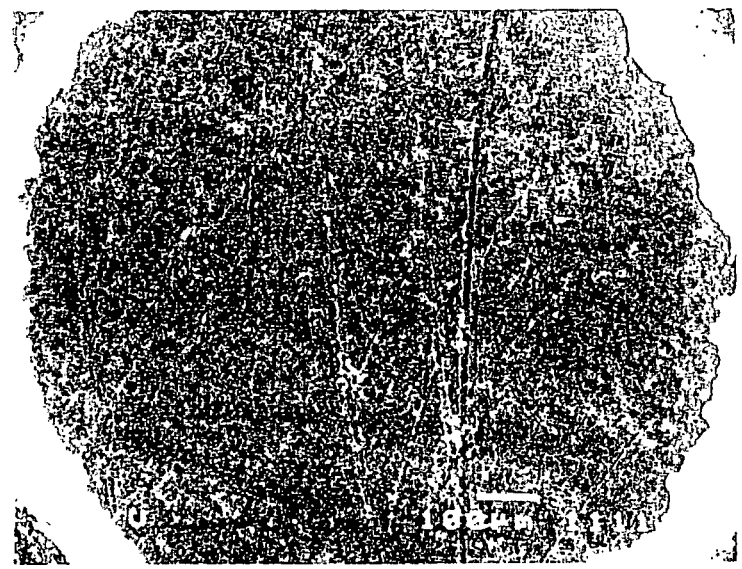
FIGS. 11A and 11B are photographs substituted for drawings showing the surface condition of ribs in Comparative Example 4 after treatment, by using an electron microscope at magnifications of 100 times and 500 times.
Figure 11B:
Figure 12A:
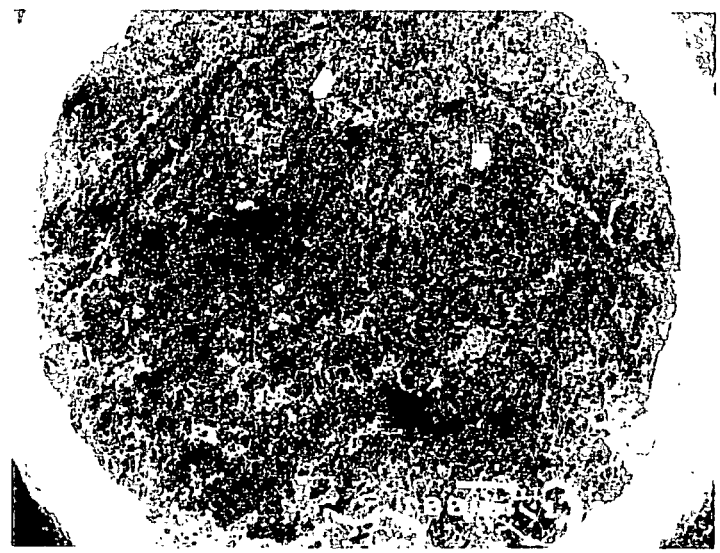
FIGS. 12A and 12B are photographs substituted for drawings showing the surface condition of ribs in Comparative Example 5 after treatment, by using an electron microscope at magnifications of 100 times and 500 times.
Figure 12B:

Contents of Tests and Results;

(1) In each of the test pieces TP of Example 1 and Comparative Examples 1 to 5, the surface condition of the ribs before the surface treatment, and that after the treatment were observed with an electron microscope at magnifications of 100 times and 500 times. Then, results shown in the photographs substituted for drawings of FIGS. 6A and 6B to FIGS. 12A and 12B were obtained. In all of Example 1 and Comparative Examples 1 to 5, the surface condition before the treatment is strictly identical with FIGS. 6A and 6B.

Figure 13:
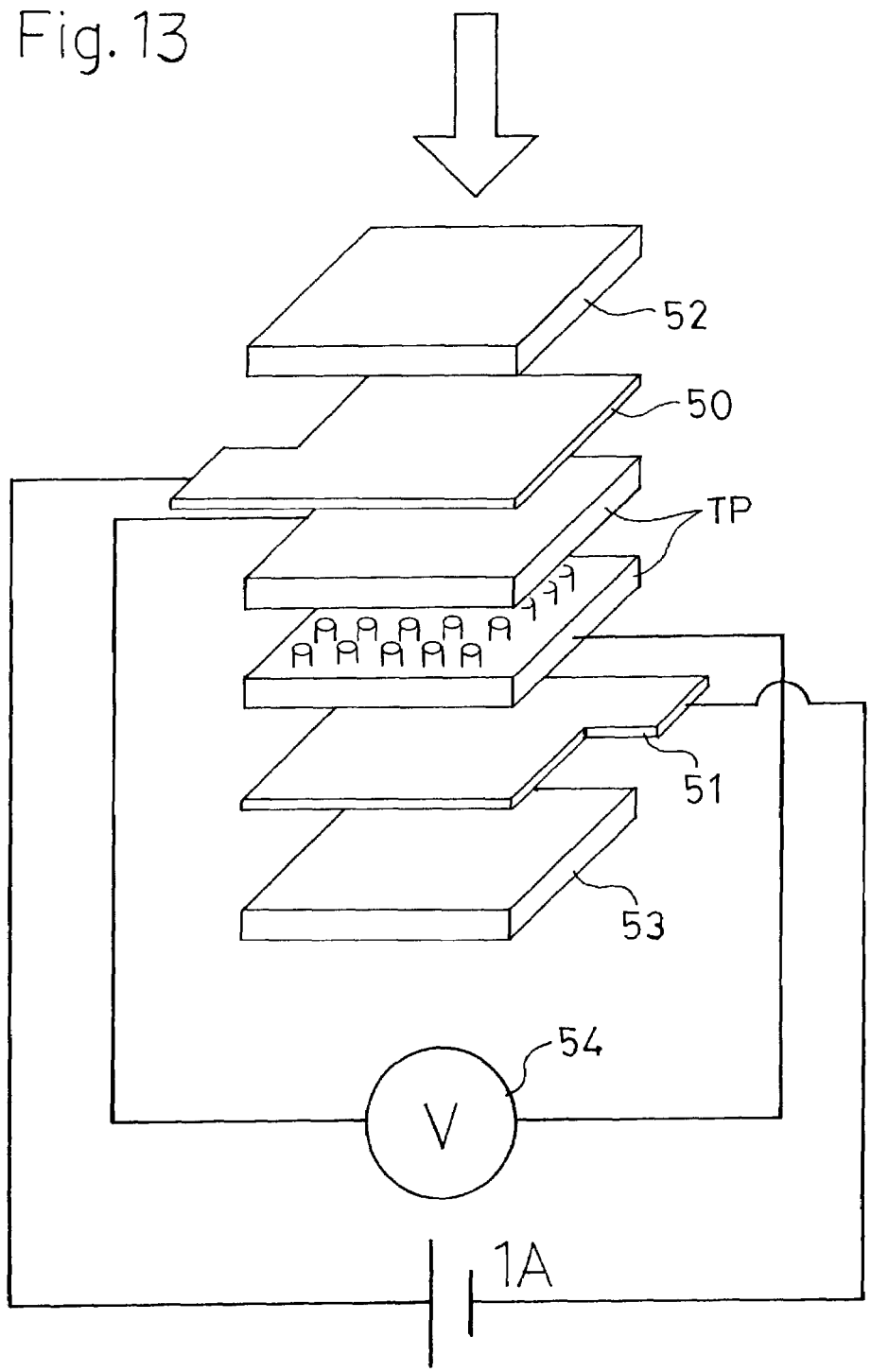
FIG. 13 is a view illustrating a manner of measuring a contact resistance with respect to the test pieces of Example 1 to Comparative Example 5.

(2) In each of the test pieces TP of Example 1 and Comparative Examples 1 to 5, the contact resistance is measured. In the measurement of the contact resistance, as shown in FIG. 13, a current of 1 A was flown between a pair of electrodes 50 and 51 which were placed on the front and rear faces of the test piece TP, the test piece TP and the pair of electrodes 50 and 51 were sandwiched between rubber sheets 52 and 53, a surface pressure of 4 MPa at the maximum was applied, and a voltage applied to the test piece TP was measured by a voltmeter 54, thereby measuring the contact resistance. Then, results listed in Table 1 below were obtained.

TABLE 1

| Sample | Contact resistance (mΩ · cm$^2$) |
| --- | --- |
| Example 1 | 1 |
| Comparative Example 1 | 8 |
| Comparative Example 2 | 8 |
| Comparative Example 3 | 9 |
| Comparative Example 4 | 8 |

TABLE 1-continued

| Sample | Contact resistance (mΩ · cm$^2$) |
|---|---|
| Comparative Example 5 | 8 |
| Conventional Example | 10 |

Discussion of Test Results:

(1) As apparent also from the photographs substituted for drawings of FIGS. 6A and 6B to FIGS. 12A and 12B, it was confirmed that, in the case of Example 1 (corresponding to the invention) in which the surfaces of the ribs are etched by an alkaline solution, only the thin resin layer which is formed on the surfaces of the ribs immediately after the resin molding process is removed away and graphite particles (K) which show a plate-like form and are soft are surely exposed from the surfaces, and also that, in the case of Comparative Examples 1 to 5 in which the surfaces of the ribs are physically removed away by polishing or the like, also graphite particles which contribute to the conductivity are removed away together to reduce the amount of graphite particles in the surfaces of the ribs, and graphite particles exposed from the surfaces are granular and have a small area.

(2) As apparent also from the above-mentioned difference in surface condition, it is seen that, in the case of Example 1, the contact area with an electrode is enlarged, the adaptability with an electrode is improved, the improvement of the adaptability in such a large contact area allows graphite particles (K) of the surfaces of the ribs to be easily deformed, resin defective portions between adjacent graphite particles (K) are filled as a result of the deformation of graphite particles (K) when the surfaces are contacted with an electrode, and, as a result, the contact resistance of the contact surface with an electrode is very smaller than that in Comparative Examples 1 to 5 in which other physical removing means is used, as shown also in Table 1.

(3) Although not indicated as a comparative example in the above-mentioned test examples, in the case of the proposal of the conventional art (Conventional Example in Table 1) in which a thin resin layer is removed away by acid-treating the surfaces of ribs, the acidic solution erodes even the inside of graphite particles during the acid treatment to impair the conductivity inherent in graphite particles. As a result, the specific resistance of the whole separator is increased, and the contact resistance with an electrode cannot be sufficiently lowered as shown in Table 1.

INDUSTRIAL APPLICABILITY

As described above, the invention is a technique wherein, in a fuel cell separator in which a complex that is configured by bonding graphite powder by means of a thermosetting resin is used and ribs for forming gas passages are formed by a resin molding method, the surfaces of ribs are etched by an alkaline solution or alkali-treated to remove a thin resin layer which is formed on the surface during the resin molding process, and graphite particles showing a plate-like form are exposed from the surfaces of ribs which function as a contact surface with an electrode, thereby remarkably lowering the contact resistance of a contact surface with an electrode which most strongly affects improvement of the performance and efficiency of the fuel cell.

The invention claimed is:

1. A method of producing a fuel cell separator in which a complex that is configured by bonding graphite powder by means of a thermosetting resin is shaped and ribs for forming fuel gas passages, oxidant gas passages, or coolant water passages are formed on at least one face, wherein said method comprises the steps of:

loading a complex compound into a mold to resin-mold a fuel cell separator of a predetermined shape including said ribs; and removing a surface resin layer of said ribs for forming passages of said resin-molded separator by etching using an alkaline solution or an immersion treatment in an alkaline solution, said ribs functioning as a contact surface with an electrode, thereby exposing graphite particles from said surfaces of said ribs.

2. A method of producing a fuel cell separator according to claim 1, wherein, as said complex, a complex in which composition ratios are set to 60 to 90 wt. % of graphite powder, and 10 to 40 wt. % of a thermosetting resin is used.

3. A method of producing a fuel cell separator according to claim 1, wherein, as said graphite powder in said complex, graphite powder in which an average particle diameter is set to a range of 15 to 125 μm is used.

4. A method of producing a fuel cell separator according to claim 1, wherein, in said etching using an alkaline solution or said immersion treatment in an alkaline solution, said surface resin layer is removed away until graphite particles exposed from said surfaces of said ribs are of a plate shape.

* * * * *